United States Patent Office 3,598,767
Patented Aug. 10, 1971

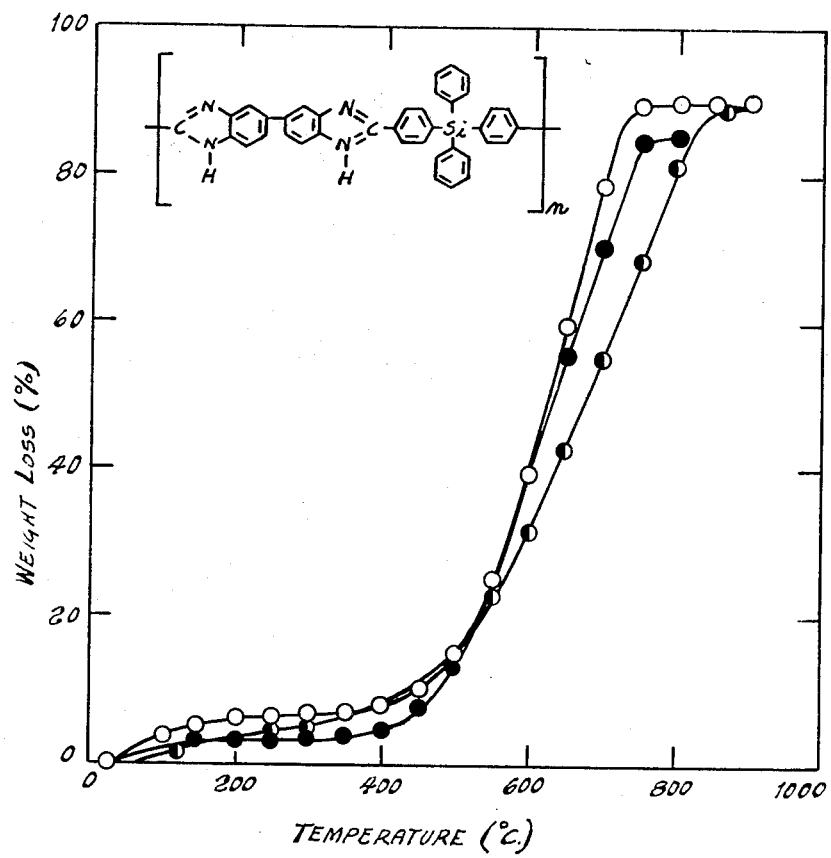
- ○ Polymer made according to Example 4.
- ◐ Polymer of Example 4 treated according to Example 5.
- ● Polymer of Example 4 treated according to Example 6 before separation into two parts by solvent fractionation.
INVENTORS.
HANNA N. KOVACS
ALVIN D. DELMAN
BERNARD B. SIMMS

3,598,767
SILICON-CONTAINING BENZIMIDAZOLE POLYMER AND METHOD OF MAKING SAME
Hanna N. Kovacs, Kew Gardens, Alvin D. Delman, Old Bethpage, and Bernard B. Simms, Franklin Square, N.Y., assignors to the United States of America as represented by the Secretary of the Navy
Filed Jan. 27, 1969, Ser. No. 794,060
Int. Cl. C08f 35/02
U.S. Cl. 260—2
2 Claims

ABSTRACT OF THE DISCLOSURE

An aromatic silicon-containing benzimidazole polymer is prepared from bis(p-carbopentachlorophenoxyphenyl) diphenylsilane obtained by oxidizing diphenyldi(p-tolyl) silane to a dicarboxylic acid and esterifying the latter. The new silicon-containing benzimidazole polymer is soluble in organic solvents, stable at temperatures ranging up to several hundred degrees centigrade, has electrical insulating properties, is moldable into a shaped solid, filament, sheet film, or film coating having good adhesion to smooth surfaces.

---

The invention described herein may be manufactured and used by or for the Government of the United States of America for governmental purposes without the payment of any royalties thereon or therefor.

There has long been a need for a solid-state material that has electrical insulating properties, that is stable over a temperature range from about room temperature up to several hundred degrees centigrade, that is soluble in organic solvents, that can be molded, formed into sheet film, extruded as a filament, or applicable as an adherent coating to a smooth surfaced metal or glass substrate.

In recent years, many investigations have been directed toward the preparation of thermally stable polymers with recurring units containing aromatic structures. K. C. Brinker and I. M. Robinson describe in their U.S. Pat. 2,895,948 reacting bis-o-diaminophenyl compounds with aliphatic dicarboxylic acid through which they introduced benzimidazoles into polymer chemistry. Subsequently, H. Vogel and C. S. Marvel reported in J. Polymer Science, Volume 50, Page 511, (1961) their preparation of fully aromatic polybenzimidazoles that exhibited high thermal stability in inert atmospheres, but which were insoluble in organic solvents. Then, improved solubility properties were achieved by incorporating disiloxane units into the polybenzimidazole structure as reported by J. E. Mulvaney and C. S. Marvel, J. Polymer Science, Volume 50, Page 541, (1961). Polymers with the disiloxane group showed much lower resistance to thermal decomposition than the fully aromatic polybenzimidazoles.

Aromatic polybenzimidazoles that had been synthesized heretofore and that have remarkable thermal and chemical stability are not significantly soluble in any organic solvent and thus have severely restricted application. They are readily soluble only in strong acids such as concentrated sulfuric, polyphosphoric, and trifluoroacetic acids.

An object of this invention is to provide a heat and chemically stable polybenzimidazole that is soluble in organic solvents.

Other objects, advantages and novel features of the invention will become apparent from the following detailed description of the invention when considered in conjunction with the accompanying drawings wherein:

The single figure shows three thermograms of polybenzimidazole prepared according to this invention, one thermogram being of the polymer prepared in accordance with the teachings of this invention and two thermograms being of the same polymer but after being subjected to two different after treatments.

This invention concerns a new type of benzimidazole polymer containing silarylene groups in the repeating units. First 4-bromotoluene is reacted with lithium to obtain 4-lithiotoluene which in turn is reacted with diphenyldichlorosilane to produce diphenyldi(p-tolyl)silane

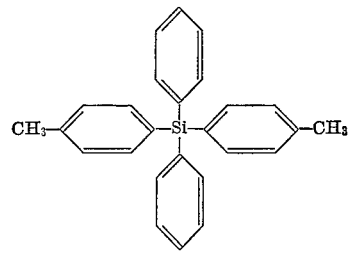

Diphenyldi(p-tolyl)silane was prepared by following the procedure of M. Maienthal, et al., reported in J. American Chemical Society, Volume 76, Page 6,392, (1954). The diphenyldi(p-tolyl)silane was oxidized to produce a dicarboxylic acid

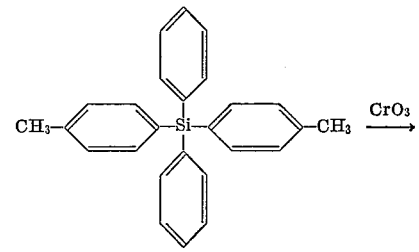

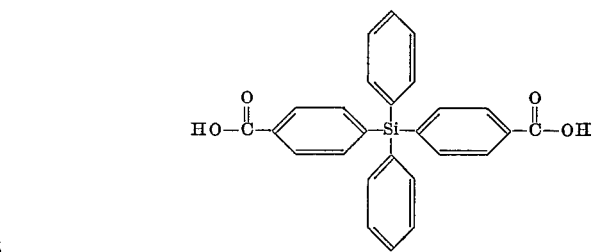

The dicarboxylic acid is esterified to prepare bis(p-carbopentachlorophenoxyphenyl)diphenylsilane

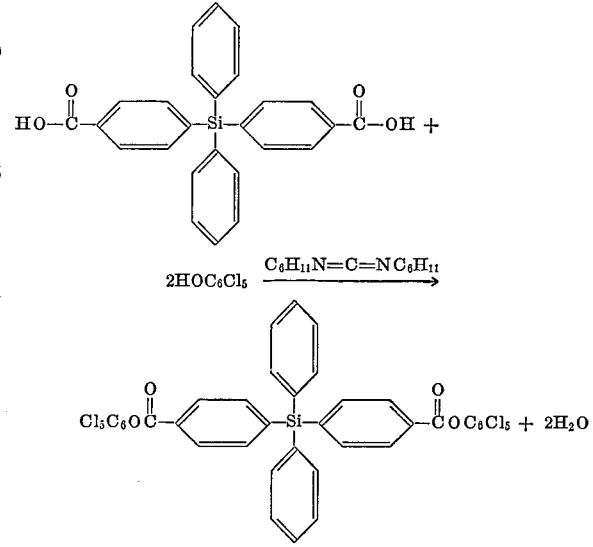

Polybenzimidazole containing silarylene groups namely poly[2,2′ - (4,4′ - diphenylsilyldiphenylene)-5,5′-bibenzimidazole] was prepared from bis(p-carbopentachlorophenoxyphenyl)diphenylsilane

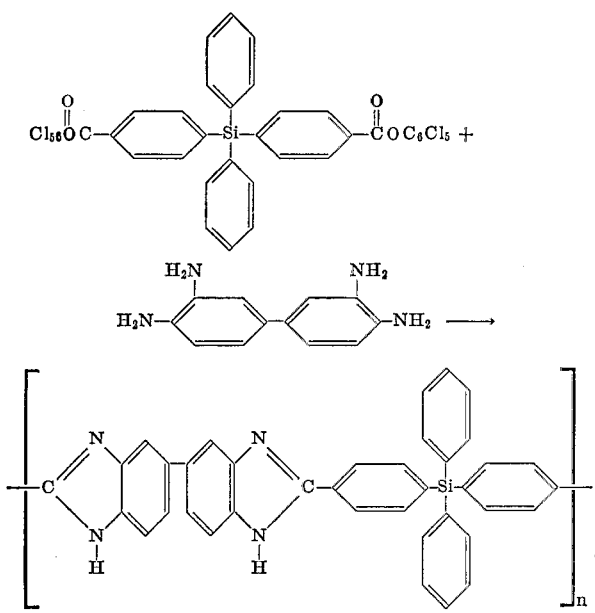

A method of preparing the dicarboxylic acid bis(p-carboxyphenyl)silane is disclosed by Speck in U.S. Pat. 2,722,524. Because the compound prepared by the Speck procedure is not sufficiently pure for the purposes set forth in this application, research to produce a more pure compound led to the method illustrated by Examples 1 and 2.

EXAMPLE 1

Oxidation of diphenyl(p-tolyl)silane to bis(p-carboxyphenyl)diphenylsilane

A well stirred solution of 90 milliliters of glacial acetic acid, 30 milliliters of acetic anhydride and 7.2 milliliters of concentrated sulfuric acid was cooled to $+10°$ C. While continuously agitating the partially frozen mixture, about 1.5 grams of chromic anhydride was added; then about 0.3 gram of diphenyldi(p-tolyl)silane was added. This sequence was repeated until a total of 0.12 mole (12 grams) of chromic anhydride was added and a total of 0.012 mole (4.4 grams) of diphenyldi(p-tolyl)silane were added, a molar ratio of 10 to 1. The two reactants were added alternately to the mixture over a period of 50 minutes. During this time, temperature was kept down to between 13–15° C. Stirring was continued for another seventy-five minutes while permitting a slight rise in temperature but strictly preventing the temperature from rising above 17° C. Then the reaction mixture was poured over crushed ice and stirred vigorously for one hour following which the mixture was filtered and a pale precipitate was obtained which was washed several times with water. The wet precipitate as then dissolved in ether. The ether solution as separated from a gummy residue and then from some of the water, and then dried over anhydrous magnesium sulfate. The drying agent was filtered out and washed thoroughly with ether three times. The ether solution combined with the ether washings was concentrated under vacuum until crystals started to form. Then petroleum ether was added, and 3.63 grams of crude bis(p-carboxyphenyl)diphenyldisilane was isolated (yield 70.8%), melting point 258°–262° C. This crude product was dissolved in ether, and petroleum ether (boiling point 37°–48° C.) was added slowly until faint cloudiness appeared. Then the solution was treated with charcoal, concentrated under vacuum until crystals appeared, and diluted with an equal volume of petroleum ether (boiling point 37°–48° C.). The crystals were separated by filtration and dried; the purified crystals melted at 266–268° C.

EXAMPLE 2

Oxidation of diphenyl(p-tolyl)silane to bis(p-carboxphenyl)diphenylsilane

To a well stirred suspension of 0.03 mole (10.92 grams) of diphenyldi(p-tolyl)silane in a mixture of 450 milliliters of glacial acetic acid, 150 milliliters of acetic anhydride, and 18 milliliters of concentrated sulfuric acid, was added 1.2 moles (120 grams) of chromic anhydride over a period of minutes while maintaining the temperature of the mixture at 15° C. The reaction mixture was stirred for an additional 10 minutes, poured onto ice and stirred vigorously for about 30 minutes. After filtering, the residue was washed thoroughly with water and air-dried to produce 12.3 grams (96% yield) of colorless crude product, melting point 258°–264° C. (uncorrected). The crude material was dissolved in acetone, treated with activated charcoal, filtered, and reprecipitated with water. The precipitate was separated, dried, and dissolved in 250 milliliters of ether. The insoluble material was removed by filtration and the ether solution was concentrated until crystals started to form. Then an equal volume of petroleum ether was added and 9.65 grams of purified white crystalline product was recovered, melting point 266°–268° C. (uncorrected).

The products of Examples 1 and 2 were presumed to be bis(p-carboxyphenyl)diphenylsilane, $C_{26}$, $H_{20}$, $O_4$ Si, in that composition the carbon is calculated as 73.56% by weight; the hydrogen 4.75% by weight; the silicon 6.62% by weight. The identity of the products was confirmed by analysis from which it was found to have 73.57% by weight carbon, 4.76% by weight hydrogen, and 6.57% silicon.

EXAMPLE 3

Preparation of bis(p - carbopentachlorophenoxyphenyl) diphenylsilane by esterification of the products of Examples 1 and 2

To a solution of 0.04 mole (10.64 grams) of pentachlorophenol in 50 milliliters of dry ethyl acetate was added 0.64 mole (8.24 grams) of dicyclohexylcarbodiimide in 50 milliliters of the same solvent. After standing at room temperature for 10 minutes, 0.01 mole (4.24 grams) of bis(p-carboxyphenyl)diphenylsilane obtained from the preceding examples suspended in 100 milliliters of ethyl acetate was added to the clear solution and dissolved immediately. After a few seconds crystal formation was observed. The reaction mixture was left standing at room temperature for 15 hours, then refluxed for 2.5 hours, then concentrated under vacuum to a volume of 100 milliliters, and then cooled in an ice bath for several hours. The crystalline material that formed was separated by filtration and washed, in sequence, with ice cold ethyl acetate, acetone, and ether to remove unreacted starting materials. Then the residue was washed with about 300 milliliters of benzene to dissolve the bis(p-carbopentachlorophenoxyphenyl)diphenylsilane, and separating out insoluble dicyclohexyl urea. The benzene solution was concentrated under vacuum to a volume of 50 milliliters, then diluted with 250 milliliters of dry acetone, and cooled in an ice bath for an hour to give 6.5 grams of diester, bis(p - carbopentachlorophenoxyphenyl)diphenylsilane, melting point 269°–271° C. An additional gram of the diester having melting point 264°–266° C. was recovered from the mother liquor to produce a total yield of 81.4%. A sample of the diester was recrystallized from a mixture of one part benzene and ten parts ethyl acetate and dried in vacuum over boiling water. The melting point of the sample was 269° to 271° C. uncorrected. In bis(p-carbopentachlorophenoxyphenyl)diphenylsilane, $C_{38}H_{18}Cl_{10}O_4Si$, carbon is 49.55% by weight, hydrogen is 1.97% by weight, chlorine is 38.49% by weight, and silicon is 3.05% by weight. The presumed identity of the sample was confirmed by analysis wherein carbon was 49.94% by weight, hydrogen was 1.95% by weight, chlorine was 38.14% by weight, and silicon was 2.91% by weight.

EXAMPLE 4

Preparation of poly[2,2-(4,4'-diphenylsilyldiphenylene)-5,5-bibenzimidazole]

3,3'-diaminobenzidine was purified by recrystallization from $CH_3OH$, melting point 178°–179° C. in the manner described by H. Vogel and C. S. Marvel in J. Polymer Science, volume 50, page 511 (1961). In an atmosphere of nitrogen, a mixture of 0.002 mole (1.842 grams) of bis(p-carbopentachlorophenoxyphenyl)diphenylsilane and 0.002 mole (0.428 gram) of 3,3'-diaminobenzidine suspended in 50 milliliters of N,N-dimethylaniline was stirred vigorously for 15 minutes at room temperature and then heated in a Wood's metal bath. At 130° C. a clear solution was obtained. After refluxing for ½ hour, boiling point 197° C., a yellow precipitate began to form. Refluxing was continued for another three hours and the precipitate was separated by filtration, washed successively with N,N-dimethylaniline, benzene, acetone and ethyl acetate, and dried under vacuum to give 0.98 gram (yield 86.5%) of light orange polymer. The inherent viscosity of the polymer was found to be 0.57 as measured by a 0.5% solution of the polymer in N-N'-dimethylacetamide containing 5% of lithium chloride at 30° C. On the presumption that the polymer was poly[2,2'-(4,4'-diphenylsilyldiphenylene)-5,5'-bibenzimidazole],

the calculated analysis of the polymer was carbon 80.53%, hydrogen 4.62%, nitrogen 9.89%, silicon 4.96%. The identity of polymer was confirmed by an analysis from it was found that the polymer had 77.07% carbon, 4.76% hydrogen, 9.73% nitrogen, 4.87% silicon, 1.54% chlorine from chain ends and from an infrared spectrum analysis of the polymer which showed absorption peaks at 2.92, 3.25, 6.14, 6.23, 6.50, 7.90 and 8.90 microns.

EXAMPLE 5

Aftertreatment of the product of Example 4

The inherent viscosity of the product was increased substantially by refluxing a 0.3 gram sample in mixture with 30 milliliters of Tetralin, boiling point 207° C. under a nitrogen atmosphere for 37 hours. After filtration to remove the Tetralin, the residual polymer was washed with benzene, ethyl acetate, and petroleum ether to produce an orange polymer with inherent viscosity of 1.23, concentration of 0.2% in N,N-dimethyl acetamide containing 5% of lithium chloride at 30° C. The infrared spectrum of the product was identical to that obtained from the lower molecular weight product. From an analysis of the product it was found to include 78.66% by weight carbon, 4.82% by weight hydrogen, 9.45% by weight nitrogen, 4.81% by weight silicon and 0.14% chlorine from chain ends.

EXAMPLE 6

Partial crosslinking of polybenzimidazole

When the polymer with inherent viscosity of 0.57, concentration 0.5% in N,N-dimethyacetamide made in Example 4 was heated for four hours at 340°–350° C. at 1 mm. Hg. pressure, a tan product was obtained. From analysis it was found to include 78.46% carbon by weight, 4.96% by weight hydrogen, 9.89% by weight nitrogen, 6.01% by weight silicon, and 0.15% by weight chlorine from chain ends. After adding the tan product to N,N-dimethylacetamide, the mixture was filtered to remove the insoluble farction which was about 30% of the original polymer by weight. Acetone was added to the filtrate to precipitate that portion which is uncured poly[2,2-(4,4'-diphenylsilyldiphenylene)-5,5-bibenzimidazole] with an inherent viscosity of 0.56, concentration 0.25 in N,N-dimethylacetamide at 30° C.

EXAMPLE 7

Preparation of poly[2,2-(4,4'-diphenylsilyldiphenylene)-5,5-bibenzimidazole]

As in Example 4, 3,3'-diaminobenzidine was purified by recrystallization from $CH_3OH$. In an atmosphere of nitrogen a mixture of 0.001 mole (921 milligrams) of pentachlorophenyl ester, and 0.001 mole (214 milligrams) of the 3,3'-diaminobenzidine suspended in 20 milliliters of N,N-diethylaniline, boiling point 216° C. was stirred for 15 minutes at room temperature then heated in a Wood's metal bath, and refluxed for ten hours. The precipitate was separated by filtration, washed successively with N,N-diethylaniline, benzene and ethyl acetate, and dried under vacuum to give 530 milligrams (93.5% yield) of tan polymer with inherent viscosity 0.55, concentration 0.5% in N.N-dimethylacetamide.

EXAMPLE 8

Bis(p - carbopentachlorophenoxyphenyl)diphenylsilane 0.001 mole (921 milligrams) and 0.001 mole (214 milligrams) of 3,3'-diaminobenzidine was dissolved in 15 milliliters of quinoline and kept at room temperature in an atmosphere of nitrogen for 16 hours. The solution was refluxed for four hours and then poured into 150 milliliters of ethyl acetate. Then the precipitate was washed with ethyl acetate, benzene and acetone and dried. The purified solid weighed 440 milligrams (77.6% yield) of tan color poly[2,2 - 4,4' - diphenylsilyldiphenylene) - 5,5-bibenzimidazole] with inherent viscosity of 0.58 as measured from 0.5% solution of polymer in N,N-dimethylacetamide at 30° C.

EXAMPLE 9

After treatment of the product of Example 4

A sample of silicon-containing polybenzimidazole having an inherent viscosity of 0.40 from a 0.7% solution of N,N-dimethylacetamide at 30° C. and an inherent viscosity of 0.31 from a 0.2% solution of pyridine at 30° C., which was prepared according to Example 4, was heated within 30 minutes to 240° C. under 1 mm. Hg pressure. Heating was continued at 242°–252° C. for .25 hours, then at 276°–288° C. for seven hours, and finally at 285°–293° C. for five hours. The resultant brick-colored polymer had an inherent viscosity of 0.55 in 0.16% pyridine solution at 30° C.; showing that the molecular weight of the product was increased by heating under these conditions. The polymer was no longer completely soluble in N,N-dimethylacetamide.

All the silicon-containing polymers prepared according to the Examples 4, 5, 7 and 8 were soluble in dimethylformamide, dimethylsulfoxide, N,N - dimethylacetamide and pyridine.

Thermograms from specimens of silicon-containing polybenzimidazole made in accordance with this invention are shown in the drawing. All of the samples were obtained originally from a polymerization reaction in boiling N,N-dimethylaniline, boiling point 194° C., in accordance with Example 4. The plotted points for the thermogram for this original polymer is indicated by circles. A thermogram of the original polymer of Example 4 treated according to Example 5 by boiling in Tetralin, boiling point 207° C. for 37 hours to increase its inherent viscosity from 0.57 to 1.23 is shown with plotted points indicated by circles that are one-half black. A thermogram of the original polymer of Example 4 treated according to Example 6, before separation into two parts by solvent fractionation, that is, by heating for four hours at 340°–350° C. at 1 mm. Hg pressure, is shown with plotted points indicated by completely black circles. The thermograms show that at temperatures up to about 400° C., the sample prepared by heating under vacuum at 340°–350° C. generally lost less weight than the other polymer samples synthesized at lower temperatures. Results also indicate that the higher molecular weight polymer is somewhat more heat stable than the lower molecular weight specimens.

Samples of the polymer made according to Example 4 were subjected to 300° C. for six hours and over that time lost 6.1% weight. During the initial two hour period, the samples rapidly lost 5.4% of its weight; then the rate of weight loss declined appreciably. It is postulated that within the first two hours at 300° C., the weight loss was due to the volatilization of absorbed water, trapped high boiling solvent, and some end group reaction products. The infrared spectrum of films of the polymer made according to Example 4 and deposited on sodium chloride crystals that were heated for six hours in air at 300° C. was identical to the spectrum of the original polymer. The spectrum of the polymer made according to Example 4 exhibited no change in infrared spectrum until it was heated in air for 100 hours at 300° C. when a small absorption made appeared to at 4.48 microns.

Films of the polymer made according to Example 4 deposited on aluminum from N,N-dimethylacetamide and heated in air from 100 hours at 300° C. was slightly darkened and showed excellent adhesion to the aluminum substrate after being flexed manually.

Obviously many modifications and variations of the present invention are possible in the light of the above teachings. It is therefore to be understood that within the scope of the appended claims the invention may be practiced otherwise than as specifically described.

We claim:
1. A polymer having the following recurring unit,

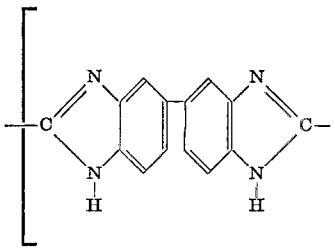

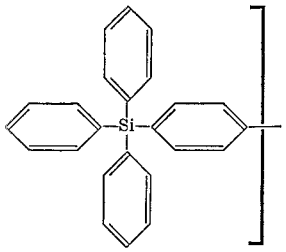

2. The method of making poly[2,2'-(4,4'-diphenyl-silyldiphenylene)-5,5-bibenzimidazole] consisting of
oxidizing diphenyl (p-tolyl)silane to bis (p-carboxyphenyl) diphenylsilane by adding alternately chromic anhydride and diphenyldi (p-tolyl)silane as reactants to an agitated mixture of glacial acetic acid, acetic anhydride and concentrated sulfuric acid at an initial temperature of about +10° C.,
esterifying the bis(p-carboxyphenyl) diphenylsilane to bis (p - carbopentachlorophenoxyphenyl) diphenylsilane by adding dicyclohexylcarbodiimide dissolved in dry ethyl acetate to a solution of pentachlorophenol dissolved in dry ethyl acetate all at room temperature and then adding the bis(p-carboxyphenyl)diphenylsilane suspended in ethyl acetate,
reacting (p-carbopentachlorophenoxyphenyl) diphenylsilane and 3,3'-diaminobenzidine by preparing a mixture of the bis(p-carbopentachlorophenoxyphenyl) diphenylsilane and 3,3' - diaminobenzidine suspended in N,-N-dimethylaniline at room temperature and refluxing and then separating the precpitated reaction product and purifying the reaction product by washing.

References Cited
UNITED STATES PATENTS 3,376,233  4/1968  Gall _____ 260—2

DONALD E. CZAJA, Primary Examiner

M. I. MARQUIS, Assistant Examiner

U.S. Cl. X.R.

117—126, 135.1; 252—63.7; 260—30.8, 32.4, 32.6 46.5, 78.4, 448.2